(12) United States Patent
Yeh

(10) Patent No.: US 8,138,624 B2
(45) Date of Patent: *Mar. 20, 2012

(54) CONVERSION DEVICE FOR AUTOMOBILE

(76) Inventor: Ming-Hsiang Yeh, Taipei (TW)

( * ) Notice: Subject to any disclaimer, the term of this patent is extended or adjusted under 35 U.S.C. 154(b) by 800 days.

This patent is subject to a terminal disclaimer.

(21) Appl. No.: 12/213,610

(22) Filed: Jun. 23, 2008

(65) Prior Publication Data

US 2009/0315393 A1    Dec. 24, 2009

(51) Int. Cl.
*B60L 8/00* (2006.01)
(52) U.S. Cl. ............. 307/10.1; 307/9.1; 307/82; 307/26
(58) Field of Classification Search .................... 307/9.1, 307/10.1, 72–75, 84, 18, 21, 22, 25, 26, 29, 307/82
See application file for complete search history.

(56) References Cited

U.S. PATENT DOCUMENTS

| | | | |
|---|---|---|---|
| 6,624,533 B1 * | 9/2003 | Swanson et al. ................. | 307/64 |
| 6,765,306 B2 * | 7/2004 | Fattic .......................... | 290/40 C |
| 7,057,376 B2 * | 6/2006 | Cook et al. ..................... | 323/207 |
| 2004/0066094 A1 * | 4/2004 | Suzuki et al. ................... | 307/18 |
| 2009/0278405 A1 * | 11/2009 | Stancu et al. ................ | 307/10.1 |
| 2010/0000804 A1 * | 1/2010 | Yeh .............................. | 180/2.2 |

* cited by examiner

*Primary Examiner* — Fritz M Fleming
(74) *Attorney, Agent, or Firm* — Rosenberg, Klein & Lee

(57) ABSTRACT

A conversion device is provided for an automobile, including a conversion circuit, input port(s), output port(s), and a power flow sensor. The input port function to receive a power input. The conversion circuit includes a DC bus and a plurality of converters. An input side of the DC bus is connected to an input conversion module, and an output side of the DC bus is connected to a DC/DC converter, a DC/AC inversion converter, and a bi-directional DC/DC converter for converting the power input from the input port. The power flow sensor is connected between the input port and the input conversion module of the input side to sense and feed power flow of the power input from the input port to the conversion circuit for carrying out power conversion. The output port is connected to the converters of the output side for output of power. As such, the power input at the input port is converted by the conversion circuit and supplied through the output port and the power flow sensor detects the power flow of the input power at the input port to various power sources to continuously supply power to the automobile thereby providing practicability and convenience of ensuring continuous supply of power and substantially enhancing the cruising distance of the automobile.

9 Claims, 3 Drawing Sheets

CONVERSION DEVICE FOR AUTOMOBILE

FIELD OF THE INVENTION

The present invention relates to a conversion device for automobiles, and in particular to an automobile conversion device that is comprised of various converters and a power flow sensor for detecting power flow in order to facilitate selection among various power sources for power supply to the automobiles and to ensure continuous power supply to the automobiles by the various power sources and even providing an output of power for other uses.

BACKGROUND OF THE INVENTION

Vehicles, includes automobiles and motorcycles, are powered by fossil fuels, such as gasoline and diesel. The natural resources of the fossil fuel are limited in the Earth. Apparently, continuous increase of the price of the fossil fuel is unavoidable. In other words, the world is now in a high fuel price era. Further, using the fossil fuel to power an automobile requires combustion of the fossil fuel, which, no matter the combustion is completed or not, causes pollution to the atmosphere. Thus, all the countries around the world are devoted to the development of environment-conservative vehicles.

To reduce the impact caused by the high fuel price and also to reduce the pollution caused by combusting the fossil fuel, using substitute energies to operate the automobile is a major issue for the development of the environment-conservative vehicles.

A variety of substitute energies are available today, and among these substitute energies, electricity is the one that best suits the needs of human society. Thus, electrical vehicles are developed and manufactured. The electrical vehicle is operated by providing a battery system in the vehicle and the battery system supplies electricity to a driving device of the vehicle for generating a driving force. However, the state-of-art vehicle battery does not have a sufficient cruising distance for the vehicle and has to be constantly recharged, which can be done by means of for example a wind power generation device or a solar power generation device, to maintain continuous operation of the electrical vehicle.

Due to the fact that various power generation devices are now available, the present invention is aimed to provide a technique that allows an automobile to be connected to various power sources, such as a solar power generation device and a wind power generation device, or pubic utility system or a power charging station, to ensure continuous supply of power and avoid interruption of power supply during the operation of the automobile.

SUMMARY OF THE INVENTION

An objective of the present invention is to provide a conversion device for an automobile, which features the arrangement of a conversion circuit and input ports, the output ports, and a power flow sensor connected to the conversion circuit by means of which the conversion device of the present invention is connectable to various power sours and converts the various power sources into a usable power for the automobile, so as to ensure continuous supply of power and eliminate interruption of power supply during the operation of the automobile thereby enhancing the cruising distance of the automobile and even providing excessive power for other purposes, such as operating a portable stereo system, starting the automobile engine, or charging an automobile battery.

Another objective of the present invention is to provide a conversion device for an automobile, which, with the addition of an input selector, an output selector, and the first and second timers, provides a feature of automatically selecting a specific input port for receiving power input and automatically selecting a specific output port to which power is supplied, and controls of the input power amount, the output power amount, the output target, the input target, the output sequence and the input sequence of the input and output ports. As such, the effectiveness of coupling the conversion device with the automobile can be fully exploited, providing practicability and convenience.

To realize the above objectives, in accordance with the present invention, a conversion device is provided for an automobile, comprising a conversion circuit, at least one input port, at least one output port, and a power flow sensor. The at least one input port functions to receive power input. The conversion circuit comprises an input conversion module, a DC/DC converter, a DC/AC inversion converter, a bi-directional DC/DC converter, and a DC bus having an input side and an output side. The input side of the DC bus is connected to the input conversion module, and the output side of the DC bus is connected to the DC/DC converter, the DC/AC inversion converter, and the bi-directional DC/DC converter for converting the power input from the input port. The power flow sensor is connected between the at least one input port and the input conversion module of the input side to sense and feed power flow of the power input from the at least one input port to the conversion circuit for carrying out power conversion. The at least one output port is connected to the converters of the output side for output of power.

As such, the power input at the at least one input port is converted by the conversion circuit and supplied through the at least one output port and the power flow sensor detects the power flow of the input power at the at least one input port, whereby with the conversion device of the present invention, an automobile can be connected to various power sources to ensure continuous supply of power without interruption and thus substantially enhance the cruising distance of the automobile.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
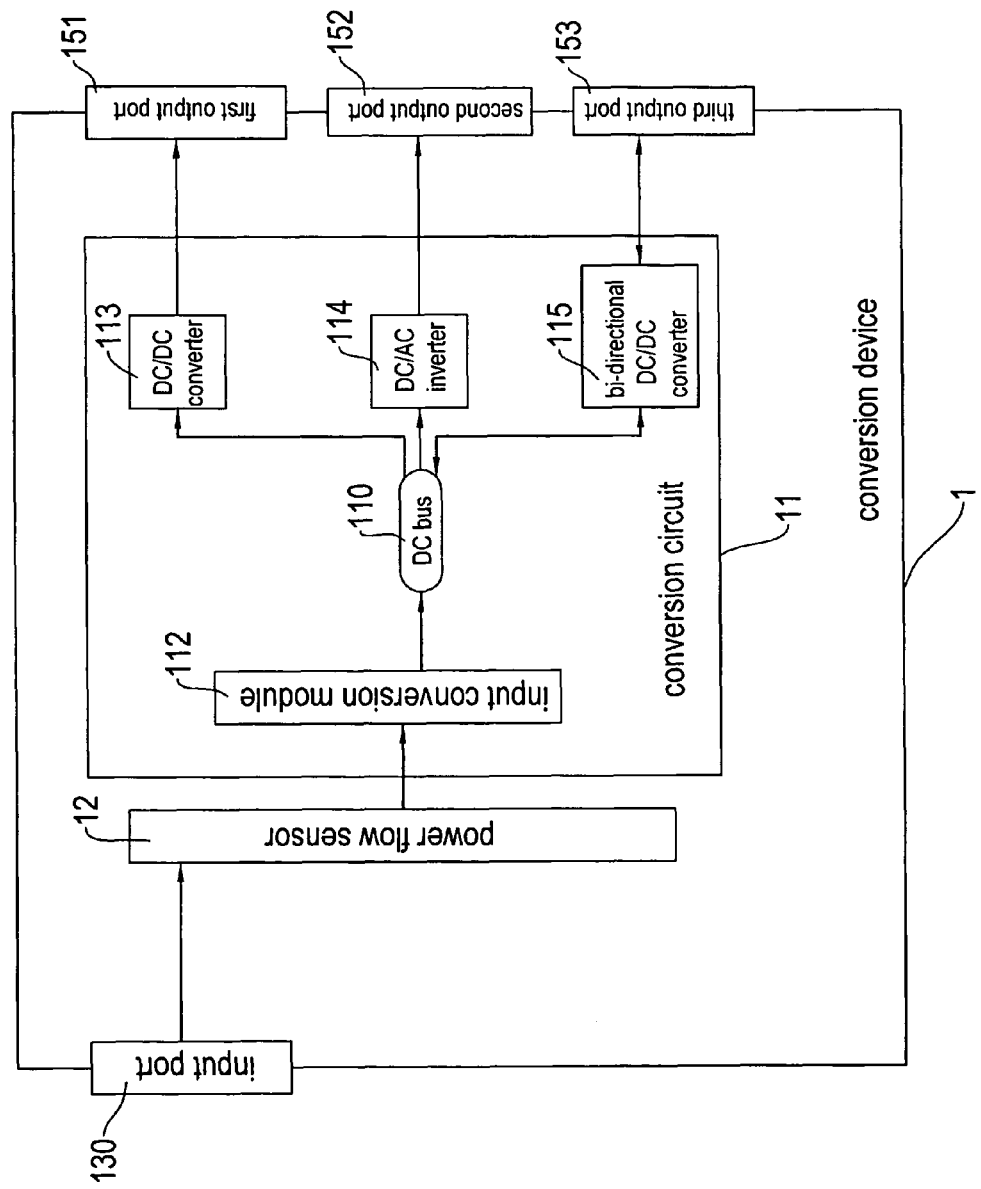
FIG. 1 is a block diagram of a conversion device in accordance with an embodiment of the present invention.

With reference to the drawings and in particular to FIG. 1, the present invention provides a power conversion device that is applicable to various automobiles. The conversion device in accordance with the present invention, generally designated at 1, comprises a conversion circuit 11, at least one input port, at least one output port, and a power flow sensor 12.

Figure 2:
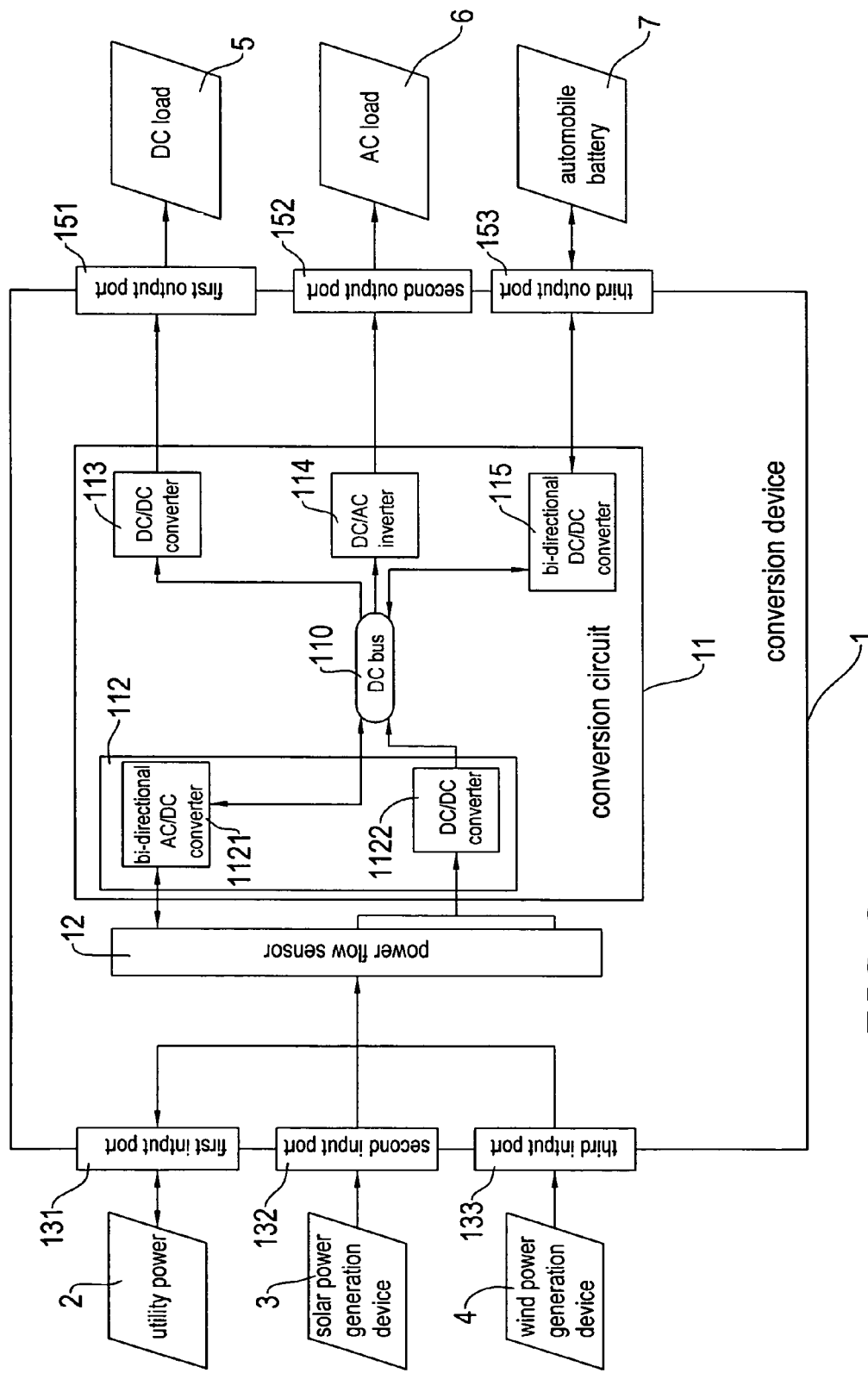
FIG. 2 is a block diagram of a conversion device in accordance with another embodiment of the present invention.

The at least one input port, which may include a single input port 130 (or alternatively includes a first input port 131, a second input port 132, and a third input port 133 and so on as shown in FIG. 2), functions to receive an input of electrical power.

The at least one output port, which may be a single output port or multiple output ports, including a first output port 151, a second output port 152, a third output port 153 and so on, functions to supply an output of power.

The conversion circuit 11 comprises a direct-current (DC) bus 110 and a plurality of converters, such as converters and inverters, including for example an input conversion module 112, a DC/DC converter 113, a DC/AC (alternate-current) inverter 114, and a bi-directional DC/DC converter 115. The DC bus 110 has an input side and an output side, of which the input side is connected to the input conversion module 112 and the output side is connected to the DC/DC converter 113, the DC/AC inverter 114, and the bi-directional DC/DC converter 115 for realizing conversion of the power received from the input port.

The power flow sensor 12 is connected to the input port 130 and the input conversion module 112 on the input side for sensing the power flow from the input port 130 and for further feeding the power to the conversion circuit 11 to carry out power conversion, such as first feeding the power to the input conversion module 112 of the conversion circuit 11 for conversion into DC power for the DC bus 110, followed by further conversion operations carried out by the DC/DC converter 113, the DC/AC inverter 114, and the bi-directional DC/DC converter 115 for output.

The output ports 151, 152, 153 are respectively connected to the converters 113, 114, 115.

As such, the power received by the at least one input port 130 is first subjected to conversion by the conversion circuit 11 and then output through the output ports 151, 152, 153 and the power flow sensor 12 functions to sense the power flow input from the at least one input port 130 to thereby realize continuous supply of power for ensuring being free of discontinuity of power supply and substantially enhance the cruising distance of automobiles.

With reference now to FIG. 2, a second embodiment in accordance with the present invention is shown, in which the conversion device of the present invention comprises input ports and output ports, both being multiple, and the input conversion module 112 on the input side comprises a bi-directional AC/DC converter 1121, such as a power supply, and a DC/DC converter 1122. The input ports 131, 132, 133 are commonly connected to the power flow sensor 12. The first input port 131 is connected, via the power flow sensor 12, to the bi-directional AC/DC converter 1121 and the second and third input ports 132, 133 are both connected via the power flow sensor 12 to the DC/DC converter 1122. The output ports 151, 152, 153 are respectively connected to the converters 113, 114, 115 on the output side. The power flow sensor 12 senses the power flows from the input ports 131, 132, 133 for facilitate selection of one or more input ports to receive the power input.

In a practical application of the conversion device 1 in accordance with the present invention, the first, second, and third output ports 151, 152, 153 are respectively connected to a DC load 5, an AC load 6, and an automobile battery 7 and are also respective and electrically connected to the DC/DC converter 113, the DC/AC inverter 114, and bi-directional DC/DC converter 115 on the output side. The first input port 131 is connected to the utility power 2, such as electric mains or a power charging station, and is also connected, via the power flow sensor 12, to the bi-directional AC/DC converter 1121 on the input side, while the second and third input ports 132, 133 are respectively connected to a solar power generation device 3 and a wind power generation device 4 and are both connected, via the power flow sensor 12 to the DC/DC converter 1122 on the input side.

As such, a driving device, such as an engine or an automobile motor (not shown) and the in-car electronics, such as automobile stereo and in-car lighting (not shown), can use the power from the automobile battery 7. When the power level of the automobile battery 7 is insufficient, the power from the power charging station or the electric mains can be connected and supplied to the first input port 131 and is then subjected to the conversions by the bi-directional AC/DC converter 1121 and the bi-directional DC/DC converter 115, whereby the converted power is charged to the automobile battery 7 via the third output port 153. When the in-car electronics operated by the power received from the solar power generation device 3, in case that the sun light is not intense enough or the weather changes from sun shinning to cloud or even raining, the power flow sensor 12 detects the insufficiency of power flow from the solar power generation device 3 and switches to a condition of being completely operated the automobile battery 7 or to a condition of using other power generation systems, instead of using the solar power generation device 3, to ensure continuous supply of power and eliminate the risk of discontinuity of power supply. When the in-car electronics are operated by the power from the wind power generation device 4, in case that the wind or blows get weak or even stop, the power flow sensor 12 can operate in a similar way to effect switching of power supplies. In addition, the conversion device 1 may also be able to supply power to, the DC load 5 or the AC load 6. For example, during staying outdoors, a portable stereo system, which represents a DC load 5, can be directly connected to the first output port 151 to receive power supplied from the automobile battery 7 of an automobile. Or alternatively, the battery of another automobile (AC load 6) can be connected to the second output port 152, and in this way, said another automobile may acquire the power required for starting the engine, realizing road rescue of said another automobile.

Figure 3:
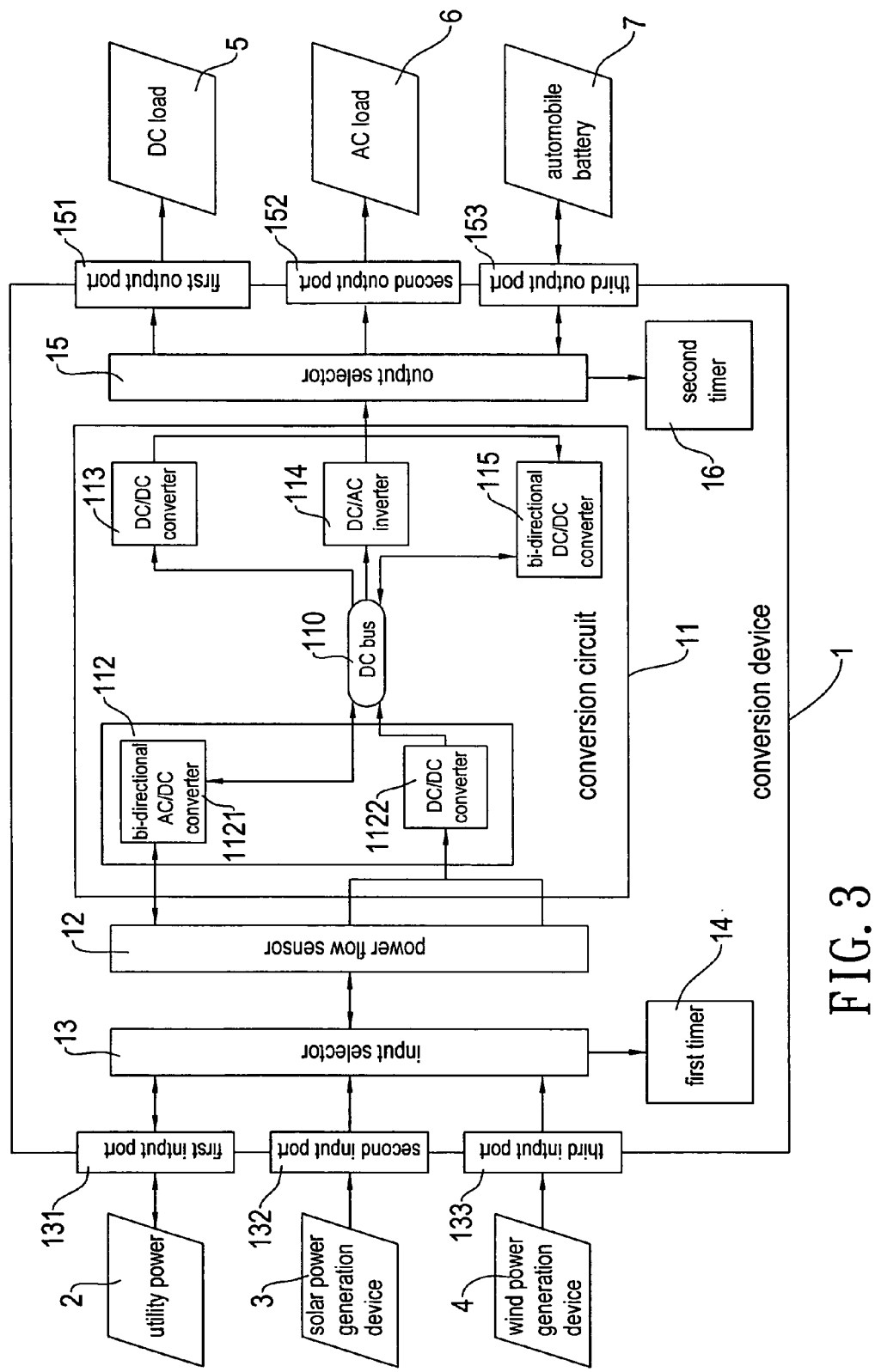
FIG. 3 is a block diagram of a conversion device in accordance with a further embodiment of the present invention.

Reference is now made to FIG. 3 and a third embodiment of the present invention is shown, which further comprises an input selector 13, a first timer 14, an output selector 15, and a second timer 16.

The input ports 131, 132, 133 are each connected to the input selector 13 and the input selector 13 is connected to the power flow sensor 12 whereby the input selector 13 bases on the input power flow detected by the power flow sensor 12 to select one of the input ports 131, 132, 133 to provide the input power. The first timer 14 is connected to the input selector 13 to effect time-measuring for power input, whereby the time when each input port 131, 132, 133 inputs power is controlled on the basis of the first timer 14.

The output ports 151, 152, 153 are each connected to the output selector 15 and the converters 113, 114, 115 on the output side are commonly connected to the output selector 15 for selection of one or more than one of the output ports to supply the output power. The second timer 16 is connected to the output selector 15 to effect time-measuring for power output, whereby the time when each output port 151, 152, 153 outputs power is controlled on the basis of the second timer 16.

In detail, the input selector 13 selects, among the input ports 131, 132, 133, one or more input ports to supply electrical in a period of time. For example, the selection can be made on the second input port 132 for supplying electrical power generated by the solar power generation device 3 for an hour, which is counted by the first timer 14. The output selector 15 functions to select, among the output ports 151, 152, 153, one or more output ports to output electrical power for a period of time. For example, the selection can be made on the first output port 151, which supplies electrical power to for example a portable stereo system (DC load 5) for an hour, which is counted by the second timer 16. The input selector 13 and the output selector 15 are operated in accordance with the first timer 14 and the second timer 16 and respectively effect control over the input ports and output ports with respect to for example the input power amount and output power amount at preset time periods, or input target and output target, or input sequence and output sequence and so on. The preset time periods indicate the time in a day, the days in a week, or the seasons in a year. For example, in the daytime of summer, the priority of power input is the solar power generation device 3 (input target) connected to the second input port 132 and excessive power is first supplied for charging the automobile battery 7 (output target) connected to the third output port 153, and then, in a lower priority, supplied to other output ports (output sequence). Or, in the nighttime, the power supplied is first used to energize the automobile head light (output sequence). Or, in a specific given period of time, a specific input port is allowed to receive a given amount of power (input amount) or a specific output port is allowed to supply a given amount of power (output power). Or, it is possible to set that in a time period from 9 o'clock in the morning to 5 o'clock in the evening from Monday to Friday, which time period is considered an outdoor parking time period, the solar power generation device 3 that is connected to the second input port 132 is activated to charge the automobile battery 7, whereby when a user of the automobile is working in this or her office, the automobile battery 7 is automatically charged for replenishing the power that has been used during the rush hours when he or she drives to the office or back to home.

In addition, referring to FIG. 2 (or FIG. 3), the first input port 131 of the conversion device 1 can be made to supply power to external devices, which is realized by two ways, the first one being that the power generated by the solar power generation device 3 (or the wind power generation device 4) is fed sequentially through the second (or third) input port 132, 133 (or further through the input selector 13 for the embodiment illustrated in FIG. 3), the power flow sensor 12, the DC/DC converter 1122, the DC bus 110, the bi-directional AC/DC converter 1121, the power flow sensor 12 (or further through the input selector 13 of the embodiment illustrated in FIG. 3), and the first input port 131 to the utility power 2. By coupling the first input port 131 with the electricity network of the utility power 2, the power can be supplied to an outlet socket in the system of the utility power 2. The second way is to supply electrical power from the automobile battery 7, which flows sequentially through the third output port 153 (or further through the output selector 15 for the embodiment illustrated in FIG. 3), the bi-directional DC/DC converter 115, the DC bus 110, the bi-directional AC/DC converter 1121, the power flow sensor 12 (or further through the input selector 13 of the embodiment illustrated in FIG. 3), and the first input port 131 to supply to the utility power 2. By coupling the first input port 131 with the electricity network of the utility power 2, the power can be supplied to an outlet socket in the system of the utility power 2.

The present invention features that with the arrangement of the conversion circuit 11 and the input ports 130, 131, 132, 133, the output ports 151, 152, 153 and the power flow sensor 12 connected to the conversion circuit 11, the conversion device 1 in accordance with the present invention is connectable to various power sources, such as various power generation devices, including solar power generation device, wind power generation device, and utility power or power charging station. Thus, in the era of high fuel price, automobiles can be powered with electricity that replaces the fossil fuels, such as gasoline and diesel, or the in-car electronics of automobiles can be powered by the electricity obtained from various power generation devices to reduce the consumption of gasoline and diesel. Since the conversion device 1 of the present invention can be connected to and convert various electricity sources into a usable power, together with the operation realized by the power flow sensor 12, the conversion device 1 of the present invention can ensure continuous supply of power and eliminate interruption of power supply so as to enhance the cruising distance of the automobile and even provide excessive power for operation of other electronic devices, such as portable stereo system, starting the automobile engine, or charging automobile battery. The conversion device 1 of the present invention, with the addition of the input selector 13, the output selector 15 and the first and second timers 14, 16, provides a feature of automatically selecting a specific input port for receiving power input and automatically selecting a specific output port to which power is supplied, and controls of the input power amount, the output power amount, the output target, the input target, the output sequence and the input sequence of the input and output ports. As such, the present invention is of practicability and convenience.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A conversion device for an automobile, comprising:
   a plurality of input ports including a first, second, and third input port functioning to receive power input;
   a conversion circuit comprising an input conversion module, a DC/DC converter, a DC/AC inversion converter, a bi-directional DC/DC converter, and a DC bus having an input side and an output side, the input side of the DC bus being connected to the input conversion module, the output side of the DC bus being connected to the DC/DC converter, the DC/AC inversion converter, and the bi-directional DC/DC converter for converting the power input from each of the input ports, the input conversion module comprising a bi-directional AC/DC converter and a DC/DC converter;
   a power flow sensor connected between each of the input ports and the input conversion module of the input side to sense and feed power flow of the power input from each of the input ports to the conversion circuit for carrying out power conversion, the power flow sensor senses the power flow from each input port to facilitate selection of one or more of the input ports to receive the power input;
   a plurality of output ports including a first, second, and third output port respectively connected to the converters of the output side for output power, the input ports commonly connected to the power flow sensor, the first input port being connected via the power flow sensor to the bi-directional AC/DC converter of the input side, both the second and third input ports being connected via the power flow sensor to the DC/DC converter of the input side, and the output ports respectively connected to the converters of the output side;
   an input selector connected to each of the input ports and the power flow sensor, whereby the input selector bases on input power flow detected by the power flow sensor to select one of the input ports to realize the input power;

a first timer connected to the input selector to effect time-measuring for power input, whereby the time when each input port inputs power is controlled on the basis of the first timer;

an output selector connected to each of the output ports and the converters of the output side commonly connected to the output selector for selection of one or more than one of the output ports to supply the output power; and a second timer connected to the output selector to effect time-measuring for power output, whereby the time when each output port outputs power is controlled on the basis of the second timer;

wherein the power input at the input ports are converted by the conversion circuit and supplied through the output ports and wherein the power flow sensor functions to detect the power flow of the input power at the input ports.

2. The conversion device as claimed in claim 1, wherein the first input port is connected to utility power and is also connected to the bi-directional AC/DC converter of the input side, and the second and third input ports are respectively connected to a solar power generation device and a wind power generation device and are both connected to the DC/DC converter of the input side.

3. The conversion device as claimed in claim 1, wherein the first, second, and third output ports are respectively connected to a DC load, an AC load, and an automobile battery and are also respective and electrically connected to the DC/DC converter, the DC/AC inversion converter, and bi-directional DC/DC converter of the output side.

4. The conversion device as claimed in claim 1, wherein the time-measuring carried out by the first timer includes time in a day, days in a week, and seasons in a year.

5. The conversion device as claimed in claim 4, wherein the time-measuring carried out the first timer includes a period of time.

6. The conversion device as claimed in claim 1, wherein the time-measuring carried out by the second timer includes time in a day, days in a week, and seasons in a year.

7. The conversion device as claimed in claim 6, wherein the time-measuring carried out the second timer includes a period of time.

8. The conversion device as claimed in claim 1, wherein the time-measuring carried out by the first and second timers includes time in a day, days in a week, and seasons in a year.

9. The conversion device as claimed in claim 8, wherein the time-measuring carried out the first and second timers includes a period of time.

* * * * *